US007004653B2

(12) United States Patent
Tsukamoto

(10) Patent No.: US 7,004,653 B2
(45) Date of Patent: Feb. 28, 2006

(54) PRINTER WITH A COPY FUNCTION FOR CARRYING OUT TWO-SET DOUBLE-SIDED PRINTING

(75) Inventor: Toshikatsu Tsukamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/934,359

(22) Filed: Sep. 7, 2004

(65) Prior Publication Data

US 2005/0053403 A1 Mar. 10, 2005

(30) Foreign Application Priority Data

Sep. 9, 2003 (JP) ............................ 2003-316430

(51) Int. Cl.
*B41J 11/50* (2006.01)
*B41J 11/44* (2006.01)
*B41L 13/04* (2006.01)
*G06F 15/00* (2006.01)

(52) U.S. Cl. ........................ 400/605; 400/76; 101/116; 101/118; 358/1.11; 358/468

(58) Field of Classification Search ................ 400/605, 400/76; 101/116, 118; 358/1.18, 1.12, 1.13, 358/1.11, 1.9
See application file for complete search history.

(56) References Cited

U.S. PATENT DOCUMENTS 4,466,733 A * 8/1984 Pels ........................... 399/364
5,659,846 A * 8/1997 Yoshioka ..................... 399/85
5,731,879 A * 3/1998 Maniwa et al. ............. 358/296
5,815,289 A * 9/1998 Yoshida et al. ............. 358/468
5,872,900 A * 2/1999 Tsuchitoi .................... 358/1.12
6,278,524 B1 * 8/2001 Kujirai et al. ............. 358/1.11
6,313,919 B1 * 11/2001 Nakagiri et al. ........... 358/1.11
6,433,882 B1 * 8/2002 Mori et al. ................ 358/1.13
6,690,477 B1 * 2/2004 Nakagiri et al. ........... 358/1.12
6,718,872 B1 * 4/2004 Kanno ........................ 101/118

FOREIGN PATENT DOCUMENTS

JP 11020272 11/2002

* cited by examiner

*Primary Examiner*—Andrew H. Hirshfeld
*Assistant Examiner*—Wasseem H. Hamdan
(74) *Attorney, Agent, or Firm*—Bacon & Thomas, PLLC

(57) ABSTRACT

A printer equipped with a copy function is capable of carrying out a two-set double-sided printing, using a series of printing papers, each of which has a printed content on one side and a blank page on the other side. With the aid of a built-in processing unit, such a series of the printing papers are regarded as serial pairs of two adjacent printing papers, and an image on one side of each printing paper is read by an image sensor, and then copied on the other side of the printing paper adjacent thereto. When the number of all the printing papers is odd, an image read on one side from the last printing paper is copied on one side of a supplementary paper sheet. When the total number n of the printing papers initially read out is even, printing paper are sequentially fed to said image printer, and printing papers, each of which is placed on a paper feed tray for printing in such a manner that its blank page on the other side is printable, are received in the order of reading by the image printer. The printer proposed herein ensures to save the paper sheets to be used along with easy operation in the printing.

9 Claims, 7 Drawing Sheets

PRINTER WITH A COPY FUNCTION FOR CARRYING OUT TWO-SET DOUBLE-SIDED PRINTING

BACKGROUND OF THE INVENTION

1. Field of the Invention

The present invention relates to a printer equipped with a copy function, and more specifically to a printer equipped with a copy function, which printer is suitable for carrying out the two-set double-sided printing.

2. Description of the Related Art

The term "two-set double-sided printing" used herein means that, using a pair of printing papers, each having a printed content, such as characters, figures, photographs or the like on one side thereof, and a blank page on the other side, the printed content on one side of the first printing paper is printed (or copied) on the other side of the second printing paper, and similarly the printed content on one side of the second printing paper is printed (or copied) on the other side of the first printing paper, so that two sets of printing papers, each being printed on both sides, are prepared. The above-mentioned printing paper having a printed content on one side and a blank page on the other side is referred to exclusively as "printing paper" in the specification, and it is discriminated from the other type paper, which is referred to as "paper" or "printing sheet" in the specification.

In carrying out the two-set double-sided printing for many printing papers by the conventional method, using a conventional printer having a copy function, for instance, a first printing paper is placed on a paper feed tray for reading, and the printed content on one side thereof is read out and temporarily stored in storage means. Subsequently, a second printing paper is placed on a paper feed tray for printing in such a manner that the printing can be carried out on the other side of the second printing paper. Thereafter, the printed content of the first printing paper is printed (or copied) on the other side of the second printing paper. Similarly, the second printing paper is placed on the paper feed tray for reading, and the printed content on one side thereof is read out and temporarily stored in storage means. Subsequently, the first printing paper is placed on the paper feed tray for printing in such a manner that the printing can be carried out on the other side of the first printing paper. Thereafter, the printed content on one side of the second printing paper is printed (or copied) on the other side of the first printing paper.

Similarly to the process as for the first and second printing papers, a third and fourth printing papers are treated. In summary, the above-mentioned process is applied to each pair of two adjacent printing papers to print or copy the printed content on one side of each printing paper onto the other side thereof. This procedure permits the two-set double-sided printing for many printing papers each having a printed content on one side and a blank page on the other side, thereby enabling the sheets of printing paper to be saved.

In the case when the two-set double-sided printing is carried out with the aid of the above procedure, a user has to stack the printing papers either on the paper feed tray for reading or the paper feed tray for printing, while always directing his attention to the reading sequence of the printing papers as well as to the side to be printed for the printing papers. Such a complicated procedure makes it difficult to perform an actual printing process, in particular with an increase in the number of printing papers.

In the related art disclosed in Japanese Examined Patent Japanese Patent Laid-Open No. 11-020272, each printed content on one side of all the printing sheets is read in, the printed content thus read in odd-numbered printing sheets is printed on the other side of even-numbered printing sheets respectively, and the printed content thus read in even numbered printing sheets is printed on the other side of odd-numbered printing sheets respectively. In this case, however, the printing sheets have blank pages on both sides without any printed content. It can be stated, therefore, that this printing process does not pertain to the two-set double-sided printing where the printing content on one side of a printing paper is printed or copied on the other side of the following printing paper, thereby making it impossible to sufficiently save the number of printing sheets.

SUMMARY OF THE INVENTION

The present invention intends to overcome the above-mentioned problems as for conventional printing machines. Accordingly, an object of the present invention is to provide a printer equipped with a copy function, which printer is capable of carrying out the two-set double-sided printing, using printing papers, each of which has a printed content on one side and a blank page on the other side, thereby enabling the number of printing papers to be saved without any extra printing sheets.

In accordance with the present invention, the above-described object is attained by a printer comprising: image read means for reading out image data in each of printing papers; data storage means for storing the image data thus read out; image print means for printing said image data thus stored; operation setting means for setting operation conditions of printing; display means for displaying the operation state of the printer and the specified operation conditions; and print process means for executing processes required to print the image data in accordance with a predetermined program, wherein at least two printing papers, each having a printed content on one side and a blank page on the other side, are used, wherein, based upon an instruction of the two-set double-sided printing which is specified by the operation setting means, the print process means allocates each of the image data read out by the image read means to the corresponding sheet number, 1, 2, . . . , n−3, n−2, n−1, n of the printing papers, and determines the total number n of the printing papers by counting the sheet number, either in the case when the total number n of printing papers is even, an even-number-sheet print control process is carried out, where image data for 2, 1, . . . , n−2, n−3, n, n−1-th printing paper are sequentially fed to the image print means, and printing papers, each of which is placed on a paper feed tray for printing in such a manner that its blank page on the other side is printable, are received in the order of reading by the image print means, whereby image data fed from the print process means are sequentially printed on the other side of the corresponding printing papers, so that the two-set double-sided printing is carried out, or in the case when the total number n of printing papers is odd, an odd-number-sheet print control process is carried out, where image data for 2, 1, . . . , n−3, n−4, n−1, n−2-th printing paper are sequentially fed to the image print means and finally the image data for n-th printing paper is fed to the image print means, and printing papers, each of which is placed on the paper feed tray for printing in such a manner that its blank page on the other side is printable, are received in the order of reading by the image print means and finally a supplementary paper sheet having blank pages on both sides is received, whereby image data for 2, 1, . . . , n−3, n−4, n−1, n−2-th printing paper fed from the print process means are sequentially printed on the other side of the corresponding printing papers and the image data for n-th printing paper is forbidden to print on one side of the n-th printing paper, but printed on one side of the supplementary paper sheet, so that the two-set double-sided printing is carried out.

In such a specific feature of the printer equipped with a copy function, as described above, the two-set double-sided printing can be carried out, using such printing papers, each having a printed content on one side and a blank page on the other side. Accordingly, the printer proposed herein allows the printing papers to be saved without any usage of new paper sheets, and furthermore, easy operation of the printer provides a very simplified operation in the printing process.

In a specific aspect of the printer according to the invention, it is preferable that the supplementary paper sheet has the same paper quality and the same size as the printing papers read out.

In a specific aspect of the printer according to the invention, the following copy process is further executed, when the print process means receives an instruction of a repeated two-set double-sided printing process input by the operation setting means: either in the case when the total number n of the printing papers initially read out is even, the image print means receives n paper sheets each having blank pages on both sides, and image data which are initially read out from one side of each of the printing papers, and then stored in the data storage means, are sequentially printed on one side of the paper sheets, and thereafter the image print means again receives the paper sheets having image data printed on one side in the state that the other side thereof is printable, and the corresponding image data are sequentially printed on the other side of the n paper sheets in accordance with the instruction of an even-number-sheet printing control process supplied from the print process means, so that a copying of the two-set double-sided printing is once more carried out; or in the case when the total number n of the printing papers initially read out is odd, the image print means receives n+1 paper sheets each having blank pages on both sides, and image data which are initially read out from one side of each of the printing papers and then stored in the data storage means, are sequentially printed on one side of the paper sheets, and thereafter the image print means again receives the paper sheets having image data printed on one side in the state that the other side thereof is printable, and the corresponding image data are sequentially printed on the other side of the n+1 paper sheets in accordance with the instruction of the odd-number-sheet printing control process supplied from the print process means, so that a copying of the two-set double-sided printing is once more carried out.

Accordingly, the two-set double-sided printing can further be repeated for paper sheets, each having blank pages on both sides, using image data read in the initial printing process. If such a procedure is m-times repeated, 2(m+1) printing matters having printed contents on both sides can be obtained in a relatively simple operation.

Moreover, in a specific aspect of the printer according to the invention, it is preferable that the paper sheets have the same paper quality and the same size as the printing papers initially read out.

Moreover, in a specific aspect of the printer according to the invention, it is preferable that the print process means includes a central processing unit, a random access memory, a read only memory for storing a printing program to be executed, a first interface for receiving image data supplied from the image read means, a second interface for sending image data to the image print means and for receiving a count signal of printing papers therefrom, a third interface for receiving an operation-setting signal from the operation setting means and a fourth interface for supplying signals representing the operation state of said printer and specified operation conditions to the display means, which are all interconnected to each other via a system bus.

Moreover, in a specific aspect of the printer according to the invention, it is preferable that the image read means is an photo-electric scanner for photo-electrically reading out an image in a printing paper and for converting the image thus read into an electric signal and outputs a signal corresponding to the number of printing papers read out.

Moreover, in a specific aspect of the printer according to the invention, it is preferable that the image print means is a laser printer unit or an electrostatic printer unit or an ink jet printer unit, which outputs a signal corresponding to the number of a printing paper to be printed and transmits the signal to the print process means, so that the signals corresponding to the image data supplied from the print process means are printed as an image.

Other objects, features and advantage of the present invention will become apparent from the following description of the preferred embodiments with reference to the accompanying drawings.

DESCRIPTION OF THE PREFERRED EMBODIMENTS

Referring now to the accompanying drawings for showing a preferred embodiment, the present invention will be described in more detailed manner.

Figure 1:
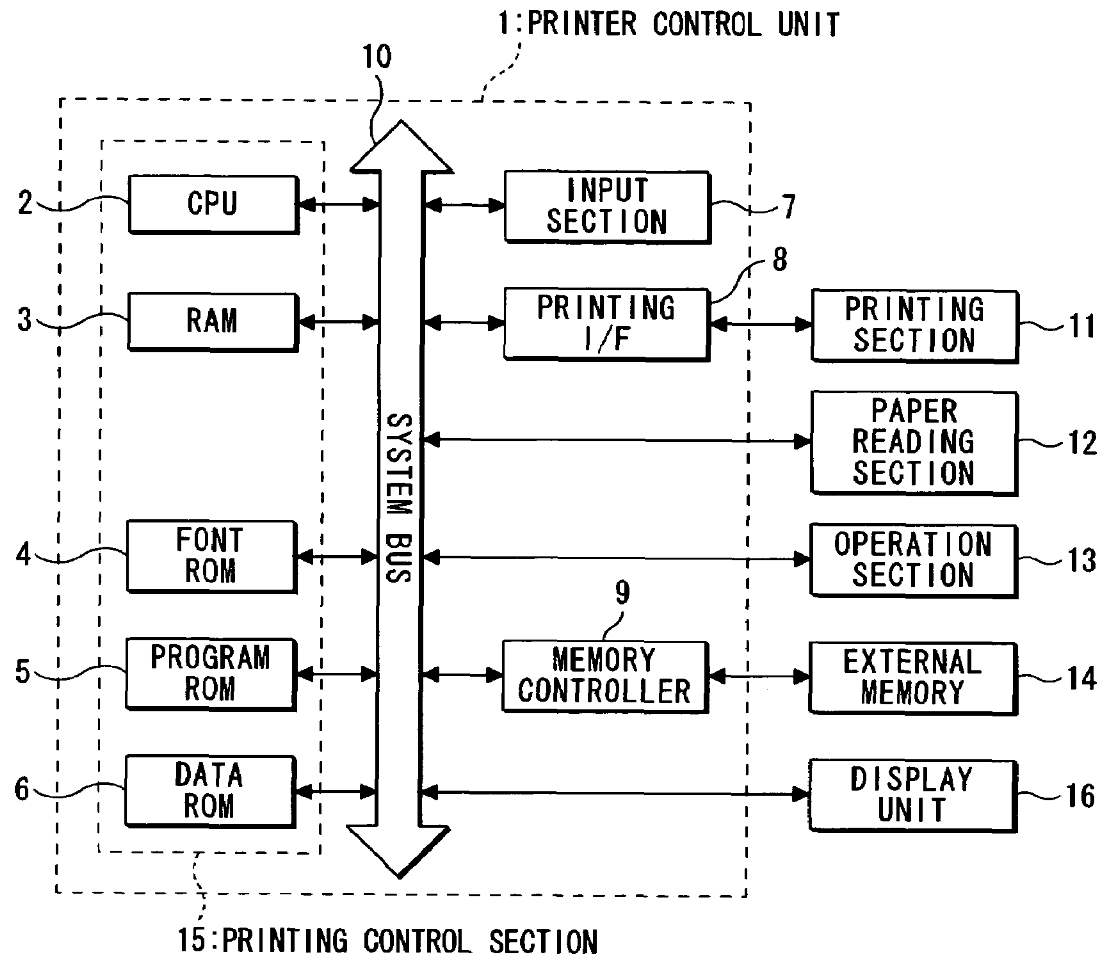
FIG. 1 is a block diagram of substantial elements in a printer equipped with a copy function in an embodiment of the invention.

FIG. 1 is a block diagram of substantial elements in a printer equipped with a copy function in an embodiment of the invention. The printer includes a printer control unit 1, printing section 11, paper reading section 12, operation section 13, external memory 14 and display unit 16.

Moreover, the printer control unit 1 comprises a CPU 2, RAM 3, font ROM 4, program ROM 5, data ROM 6, input section 7, printing I/F (interface) 8 and memory controller 9, which are all interconnected with each other via a system bus 10. To the system bus 10, the printing section 11 is connected via the printing I/F (interface) 8, and the external memory 14 is connected via the memory controller 9. Moreover, the paper reading section 12, the operation section 13 and the display unit 16 are directly connected to the system bus 10. In this case, the CPU 2 is used as a central processing unit for executing the process of controlling the individual elements in the printer control unit 1, and the RAM 3 is used as a random access memory for temporarily storing data regarding the control of the CPU 2. The font ROM 4 is used as a read only memory for storing the program of storing font data for printing characters, and the program ROM 5 is used as a read only memory for storing program necessary for the operation of the CPU 2. The data ROM 6 is used as a read only memory for storing data which are used in a host computer (not shown) connected to the input section 7, when the printer is equipped with no external memory 14, such as a hard disc.

The CPU 2 supplies an image signal as output information to the printing section 11 in accordance with either the control program stored in the program ROM 5 or the control program stored in the external memory 14. Furthermore, the CPU 2 is capable of communicating with the host computer via the input section 7, and therefore it is capable of informing information and others in the printer to the host computer.

The external memory 14, such as a hard disc, IC card or the like, is controlled as for the access to the printer by the memory controller 9. Such an external memory 14 is optionally connected thereto, and therefore stores font data, emulation program, form data or the like. The display unit 16 is used for displaying the contents of operation.

Figure 2:
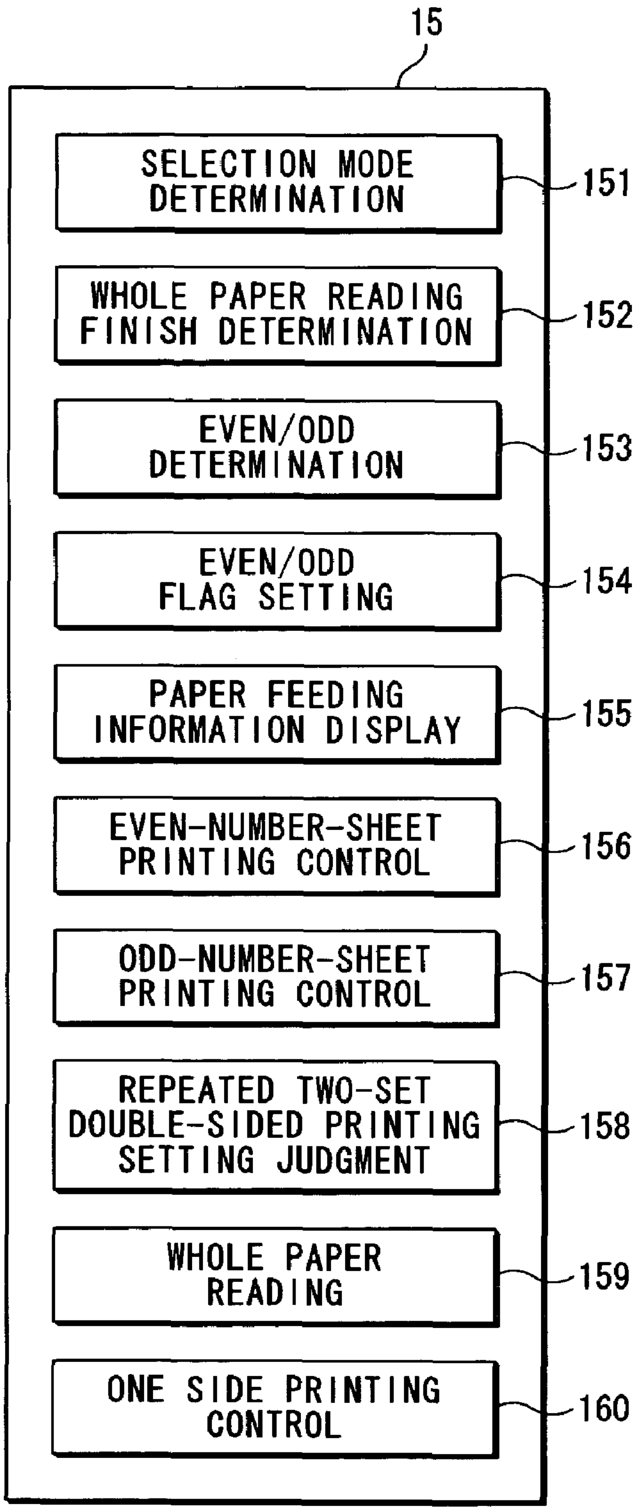
FIG. 2 is a schematic diagram of various processes executed in the printing control section in the printer according to the invention.

FIG. 2 is a block diagram for showing substantial processes executed in the printing control section 15 shown in FIG. 1. These processes are: a selection mode determination process 151 for determining whether or not a user selects the two-set double-sided printing by means of the operation section 13; a whole paper reading process 159 for reading the printed contents of all the printing papers by the printing paper reading section 12 (see FIG. 1) and for storing the contents in RAM 3 in the order of paper feeding, when the user starts to read the printed content by using the operation section 13 after it is judged that the two-set double-sided printing is selected; a whole paper reading finish determination process 152 for determining whether or not all of the papers supplied are read in conjunction with the previous process; an even/odd determination process 153 for determining whether the number of paper sheets read is even or odd after reading all of the printing papers; an even/odd flag setting process 154 either for setting an even flag to be turned on, when the number of read paper sheets is even, or for setting an odd flag to be turned on when the number of read paper sheets is odd; and a paper feeding information display process 155 for displaying on the display unit 16 (see FIG. 1) a message of placing the read printing papers on the paper feed tray for printing.

Moreover, the printing control section 15 further executes the other processes: an even-number-sheet printing control process 156; an odd-number-sheet printing control process 157; a repeated two-set double-sided printing setting judgment process 158; and a one side printing control process 160, as will be described below.

Figure 3A:
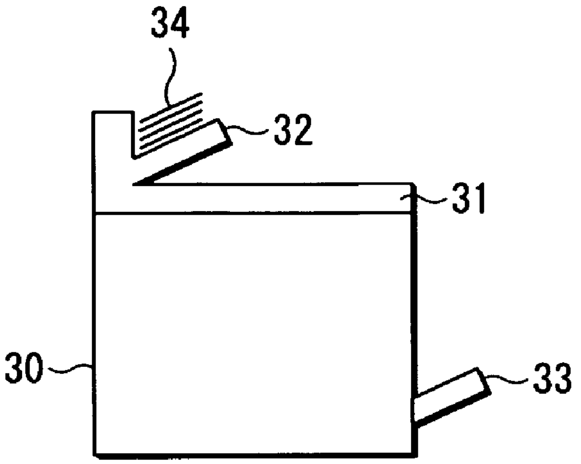
FIG. 3A is a side view of the printer where printing papers are stacked in a paper feed tray for reading in order to read the printed content thereof.
Figure 3B:
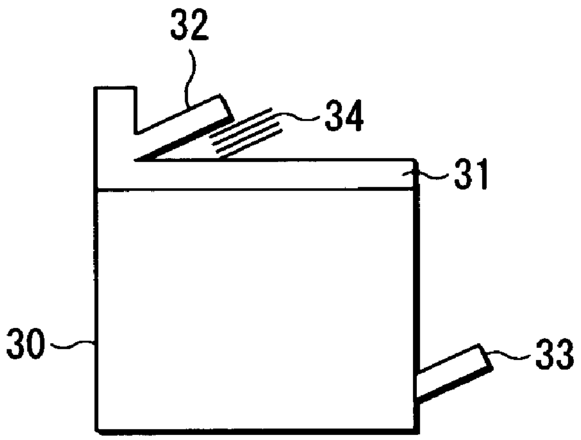
FIG. 3B is a side view of the printer where printing papers are discharged after reading the printed content thereof.
Figure 3C:
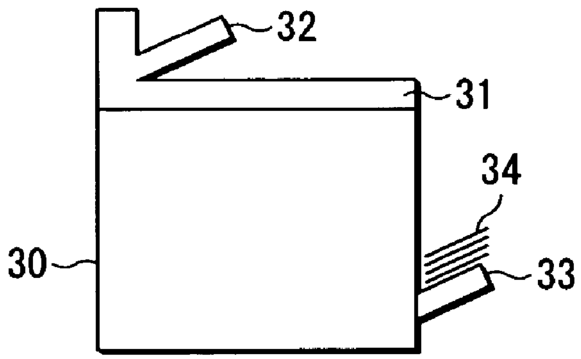
FIG. 3C is a side view of the printer where printing papers are stacked in a paper feed tray for printing.

FIGS. 3A–3C are schematic side views of a printer used in the two-set double-sided printing, where the flow of applying the process to the printing papers each having a copy printed on one side is described. In these drawings, reference numeral 30 means the main body of the printer; 31 means a scanner area; 32 means a paper feed tray for reading on which printing papers are initially placed; 33 means a paper feed tray for printing on which printing papers or the like are placed; and 34 means printing papers, each of which has a printed content on one side at the initial stage.

As shown in FIG. 3A, the printing papers 34, each having a printed content on one side, are placed on the paper feed tray 32 for reading in such a manner that the one side faces the scanner area 31. Thereafter, a user selects the two-set double-sided printing mode, and then pushes a print start button. In response to this operation, the printing paper reading section 12 (see FIG. 1) reads out the printed content on the one side of each printing paper 34, so that the image data of the printed content is temporarily stored in the RAM 3 (see FIG. 1). The printing papers 34 are discharged at a predetermined location on the scanner area 31, as shown in FIG. 3B.

Subsequently, the user puts the printing papers 34 thus discharged on the paper feed tray 33 for printing in such a manner that the other side to be printed faces the printing section 11, as shown in FIG. 3C. When receiving information of finishing user's work of placing the printing papers, the printing papers 34 is fed from the paper feed tray 33 for printing to the main body 30 of the printer, and the printed content on one side of each printing paper 34 is copied on the other side of the printing paper 34, as described below. The printing papers thus printed are discharged at an ejection location (not shown), and then the two-set double-sided printing is finished.

In an actual two-set double-sided printing, a printed content on one side of each printing paper (the total number of sheets being n) is read out in sequence of n, n−1, n−2, n−3, . . . , 2, 1 in accordance with the whole paper reading process 159 of the printing control section 15 (this sequence is inverse with respect to the actual order of reading, that is, the actual reading is carried out in sequence of 1, 2, . . . , n−3, n−2, n−1, n). When the user places the printing papers on the paper feed tray for printing, and when he informed a message of finishing the paper stack by means of the operation section 13, the printing control section 15 inspects the result of the even/odd flag setting process 154. When the even number flag is turned on, the printing control section 15 carries out the even-number-sheet printing control process 156 wherein the printed content on one side of n−1, n, n−3, n−2, . . . , 1, 2-th printing papers is read out, and then copied on the other side of n, n−1, n−2, n−3, . . . , 2, 1-th printing papers.

On the other hand, when the user places the printing papers on the paper feed tray for printing, and when he informed a message of finishing the paper stack by means of the operation section 13, the printing control section 15 inspects the result in the even/odd flag setting process 154. When the odd number flag is turned on, the printing control section 15 carries out the odd-number-sheet printing control process 157 wherein the printed content on one side of n−2, n−1, n−4, n−3, . . . , 1, 2-th printing papers is read out and then copied on the other side of n, n−1, n−2, n−3, . . . , 2, 1-th printing papers, and the printed content on one side of an n-th printing paper is copied on one side of a supplementary printing sheet which is prepared in advance by the user.

Figure 4A:
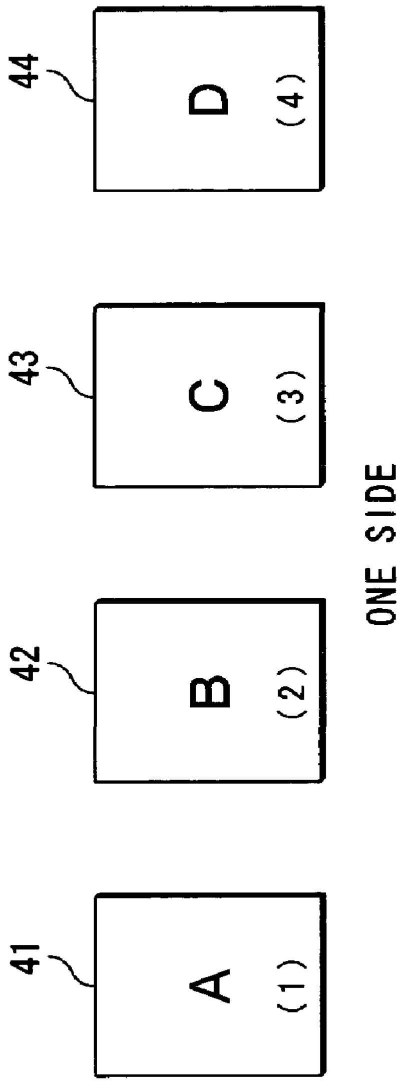
FIG. 4A is a schematic plan view of four printing papers, each having a figure printed on one side before copying.
Figure 4B:
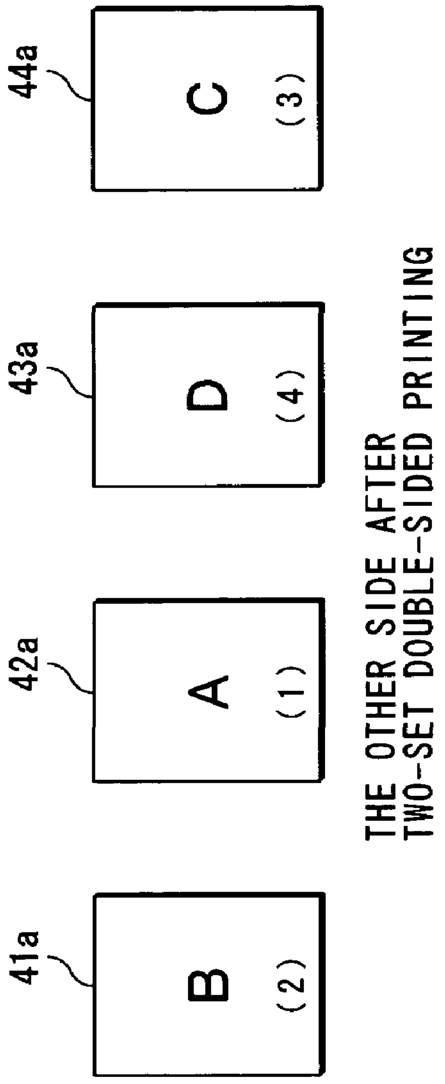
FIG. 4B is a schematic plan view of four printing papers, each having a corresponding figure copied on the other side after the two-set double-sided printing.

FIGS. 4A and 4B are plan views of printed contents in four (even number) printing papers which are prepared by the two-set double-sided printing. In FIG. 4A, reference numeral 41 means a printed content A, which is printed on one side of the first printing paper, 42 means a printed content B, which is printed on one side of the second printing paper, 43 means a printed contents C, which is printed on one side of the third printing paper, and 44 means a printed content D, which is printed on one side of the fourth printing paper. On the contrary, in FIG. 4B, reference symbol 41*a* means a printed content on the other side of the first printing paper, which content is prepared by copying the printed content B on the one side of the second printing paper, 42*a* means a printed content on the other side of the second printing paper, which content is prepared by copying the printed content A on the one side of the first printing paper, 43*a* means a printed content on the other side of the third printing paper, which content is prepared by copying the printed content D on the one side of the fourth printing paper, and 44*a* means a printed content on the other side of the fourth printing paper, which content is prepared by copying the printed content C on the one side of the third printing paper.

Accordingly, the printed contents 41 and 41*a*; printed contents 42 and 42*a*; printed contents 43 and 43*a*; and printed contents 44 and 44*a* are printed respectively on one side and the other sides of each of the first to fourth printing papers, so that one set of the printed contents A, B, C and D printed on both sides of the first and third printing papers is produced and another set of the printed contents A, B, C and D printed on both sides of the second and fourth printing papers is further produced. As a result, two sets of printing matters having the printed contents A, B, C and D on both sides can be obtained.

In this case, it is noted that the printed contents D, C, B and A on one side of the fourth, third, second and first printing papers are copied in this order on the other side of the third, fourth, first and second printing papers, respectively.

Figure 5A:
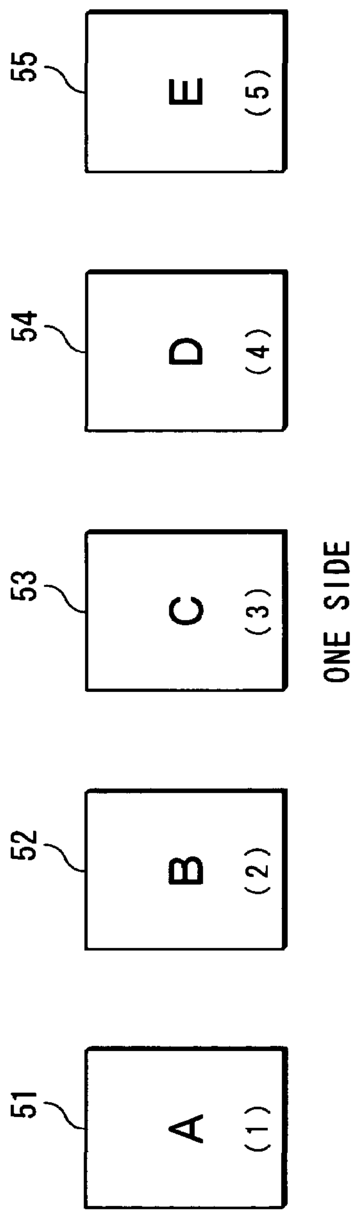
FIG. 5A is a schematic plan view of five printing papers, each having a figure printed on one side before copying.
Figure 5B:
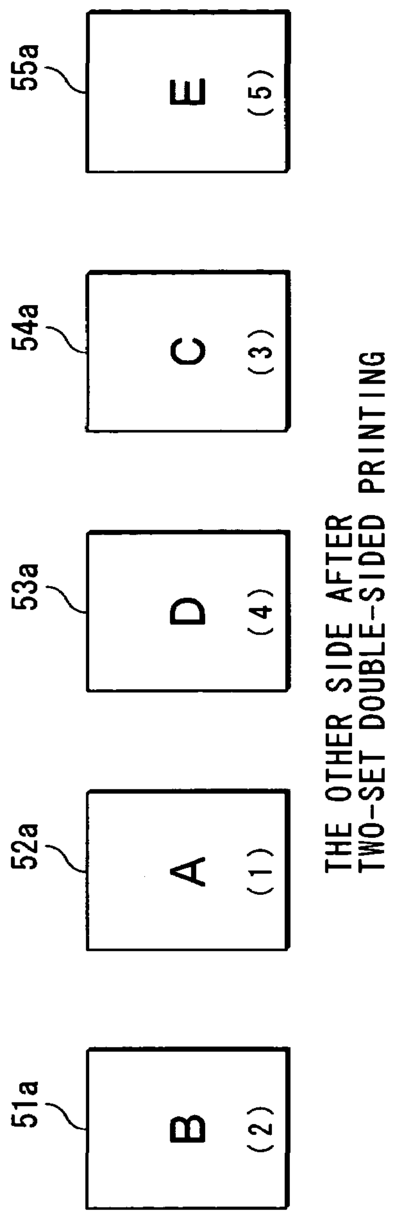
FIG. 5B is a schematic plan view of five printing papers, each having a corresponding figure copied on the other side after the two-set double-sided printing.

FIGS. 5A and 5B are plan views of printed contents in five (odd number) printing papers which are prepared by the two-set double-sided printing. In FIG. 5A, reference numeral 51 means a printed content A, which is printed on one side of the first printing paper, 52 means a printed content B, which is printed on one side of the second printing paper, 53 means a printed contents C, which is printed on one side of the third printing paper, 54 means a printed content D, which is printed on one side of the fourth printing paper, and 55 means a printed content E, which is printed on one side of the fifth printing paper. On the contrary, in FIG. 5B, reference symbol 51*a* means a printed content on the other side of the first printing paper, which content is prepared by copying the printed content B on the one side of the second printing paper, 52*a* means a printed content on the other side of the second printing paper, which content is prepared by copying the printed content A on the one side of the first printing paper, 53*a* means a printed content on the other side of the third printing paper, which content is prepared by copying the printed content D on the one side of the fourth printing paper, and 54*a* means a printed content on the other side of the fourth printing paper, which content is prepared by copying the printed content C on the one side of the third printing paper.

Accordingly, the printed contents 51 and 51*a*; printed contents 52 and 52*a*; printed contents 53 and 53*a*; and printed contents 54 and 54*a* are printed respectively on one side and the other sides of each of the first to fourth printing papers, so that one set of the printed contents A, B, C and D printed on both sides of the first and third printing papers is produced and another set of the printed contents A, B, C and D printed on both sides of the second and fourth printing papers is produced. Moreover, in order to copy the printed content 55 (=E) on one side of the fifth printing paper, a supplementary paper sheet 56, which is prepared in advance, is placed on the paper feed tray for printing to carry out the printing process, thereby enabling the content E of the fifth printing paper to be copied on one side of the supplementary paper sheet 56. As a result, two sets of printed matters having the printed contents A, B, C, D and E on both sides can be obtained, inclusive of the content E on the one side of the fifth printing paper and the content E on the one side of the supplementary paper sheet 56.

In the above case, it is noted that the printed contents E, D, C, B and A on one side of the fifth, fourth, third, second and first printing papers are copied in this order on one side of the supplementary paper sheet 56 and the other side of the third, fourth, first and second printing papers, respectively.

In the case when, for instance, the two-set double-sided printing is applied to ten printing papers, the printed contents on one side of 10, 9, 8, 7, . . . , 2, 1-th printing papers are initially read out, and then the contents thus read out on the one side from the 9, 10, 7, 8, . . . , 1, 2-th printing papers are copied on the other side of the 10, 9, 8, 7, . . . , 2, 1-th printing papers, respectively. As a result, ten printing papers including two sets of printed contents can be obtained.

In addition to the above procedure, the printer having a copy function according to the invention is capable of providing a two-set double-sided copying, using image data which are once obtained after reading out the printed contents in a series of printing papers by means of the whole paper reading process 159 of the printing control section 15 for the initial two-set double-sided printing. In this case, additional paper sheets having blank pages on both sides are used to copy the printed content on both sides of the initial printing papers, thereby making it possible to again perform the two-set double-sided printing to the supplementary paper sheets. As a result, four sets of double-sided printings can be obtained.

In order to attain this procedure, a user inputs an instruction for executing the repeated two-set double-sided printing from the operation section 13 to the printer control unit 1. In response to this instruction, the printing control section 15 identifies whether or not the repeated two-set double-sided printing is instructed (the repeated two-set double-sided printing setting judgment process 158 in FIG. 2). If so, the user prepares paper sheets having a blank page on both sides, the number of which is the same as that of the printing papers initially read out (the number being n in the case of the above description), and places the paper sheets on the paper feed tray 33 for printing. In accordance with the procedure, the printing control section 15 carries out the single-sided printing control process 160 wherein the printed contents on one side of the respective printing papers are read out in the whole paper reading process 159, and the printed contents thus read out are copied in a predetermined order on one side of the respective paper sheets.

In the next step, if the even number flag is turned on in the result of the even/odd flag setting process 154, the above-mentioned corresponding printing for copy is carried out on the other side of the prepared paper sheets in the even-number-sheet printing control process 156, so that the two-set double-sides printing can be once more attained.

If, however, the odd number flag is turned on in the result of the even/odd flag setting process 154, the above-mentioned corresponding printing for copy is carried out on the other side of the paper sheets prepared in the odd-number-sheet printing control process 157, so that the two-set double-sides printing can be once more attained.

When, therefore, it is m-times instructed that the repeated two-set double-sided printing process 157 is carried out, 2(m+1) sets of printed matters in the double-sided printing can finally be obtained.

Figure 6:
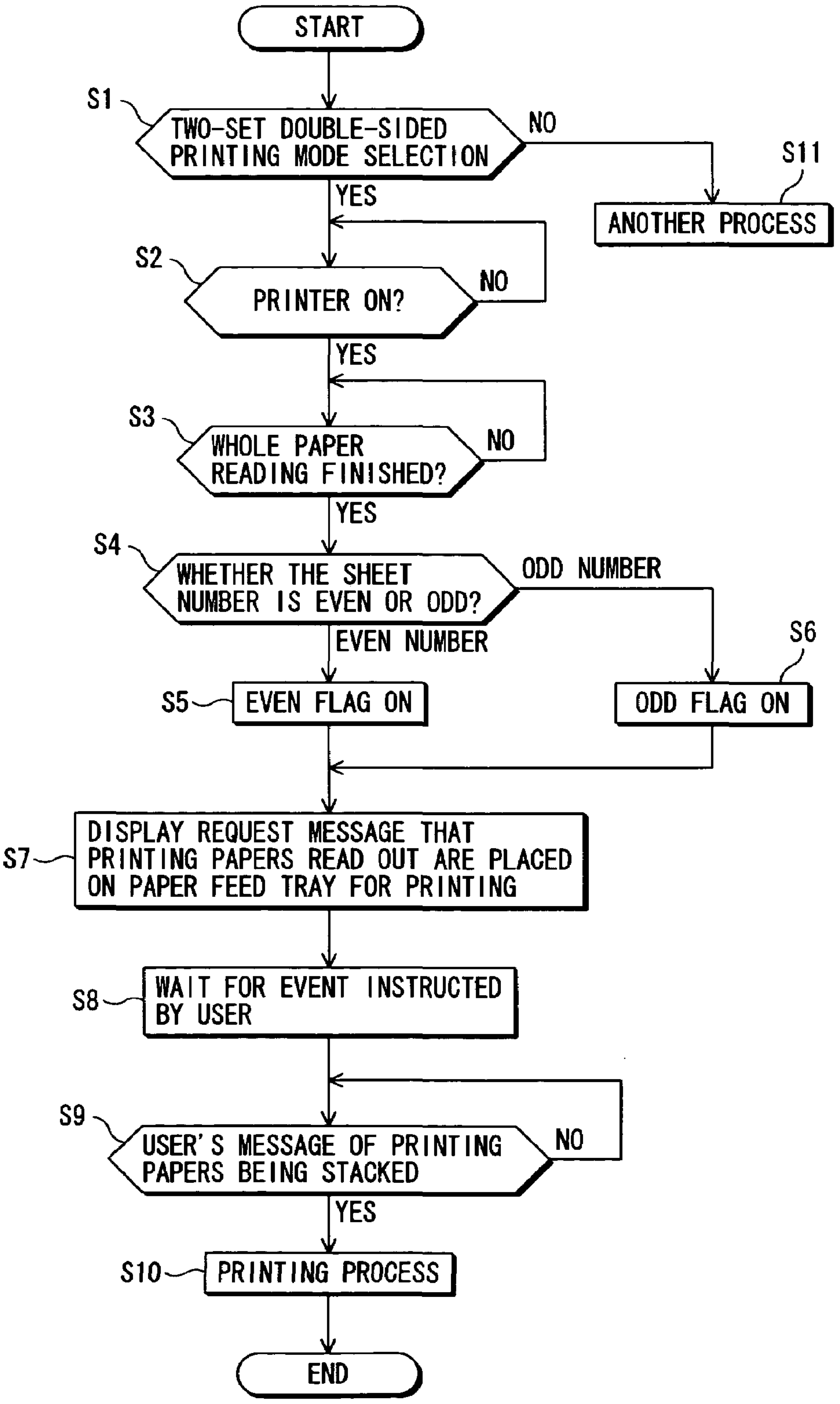
FIG. 6 is a flow chart for elucidating the procedure of the two-set double-sided printing in the present embodiment.

FIG. 6 is a flow chart for explaining the process of the two-set double-sided printing in the embodiment of the invention. In the following, the process of the two-set double-sided printing will be described, referring to the flow chart.

Firstly, a user selects the mode of two-set double-sided printing by using keys in the operation section 13. On the side of the printer control unit 1, the printing control section 15 carries out the selection mode determination process 151 in order to identify the content of operation, that is, the printing control section 15 identifies whether the mode of two-set double-sided printing or the mode of the other process, such as single-sided printing (single-sided copy) or conventional double-sided printing (double-sided copy), is selected (step S1).

When the user selects the mode of the two-set double-sided printing, it is identified in the selection mode determination process 151 that the mode of the two-set double-sided printing is selected, and printing is turned on (step S2). Then, it is identified in the whole paper reading finish determination process 152 whether or not the whole paper reading is finished (step S3).

On the other hand, when the mode of another process, in which either the single-sided printing (single-sided copy) or the conventional double-sided printing (double-sided copy) is carried out, is selected, such a process (this process is not shown in FIG. 2) starts to carry out either the single-sided printing or the conventional double-sided printing (step S11).

When the reading of the whole printing papers is finished (step S3), it is identified in the even/odd determination process 153 whether the number of printing papers read out is even or odd (step S4).

In this case, when the number of paper sheets read out in the even/odd flag setting process 154 is even, the even flag is turned on (step S5), and when the number of paper sheets read out is odd, the odd flag is turned on (step S6).

In the paper feeding informing display process 155, a message that the user is required to place the printing papers read out on the paper feed tray 33 for printing is displayed in the display unit 16 (step S7). After confirming the message, the user places the printing papers on the paper feed tray 33 for printing. As a result, the printer control unit 1 becomes in a state of waiting for the receipt of an event from the user (step S8). In order to start the printing operation, the printer control unit 1 waits for a flag to be received. When a message of the paper placing finished is received from the user (step S9), an actual printing process is started (step S10).

Regarding the printing process, the even-number-sheet printing control process 156 is executed when the even flag is turned on, whereas the odd-number-sheet printing control process 157 is executed when the odd flag is turned on. In the printing process when the even flag is turned on, the two-set double-sided printing can be carried out for all of the printing papers to be read. However, in the printing process when the odd flag is turned on, a supplementary paper sheet is added to the last printing paper stored on the paper feed tray 33 for printing, and then the printed content on one side of the last printing paper is copied on one sided of the paper sheet, applying the same procedure as that in the case of the even number sheets to the other printing papers.

In accordance with the significant feature resulting from the above-described embodiments, it is possible to print the printed content on one side of the printing papers onto the other side thereof, and therefore there is no need to use any further printing papers for the two-set double-sided printing, thereby making it possible to save the printing papers to be printed. However, only one extra paper sheet is required in the two-set double-sided printing, when the total number of printing papers is odd. Moreover, most of substantial processes in the two-set double-sided printing are carried out in the printing control section 15, and therefore the number of operations required for a user is markedly reduced, thereby enabling an easy-to-use printer for the user to be successfully provided.

Figure 7:
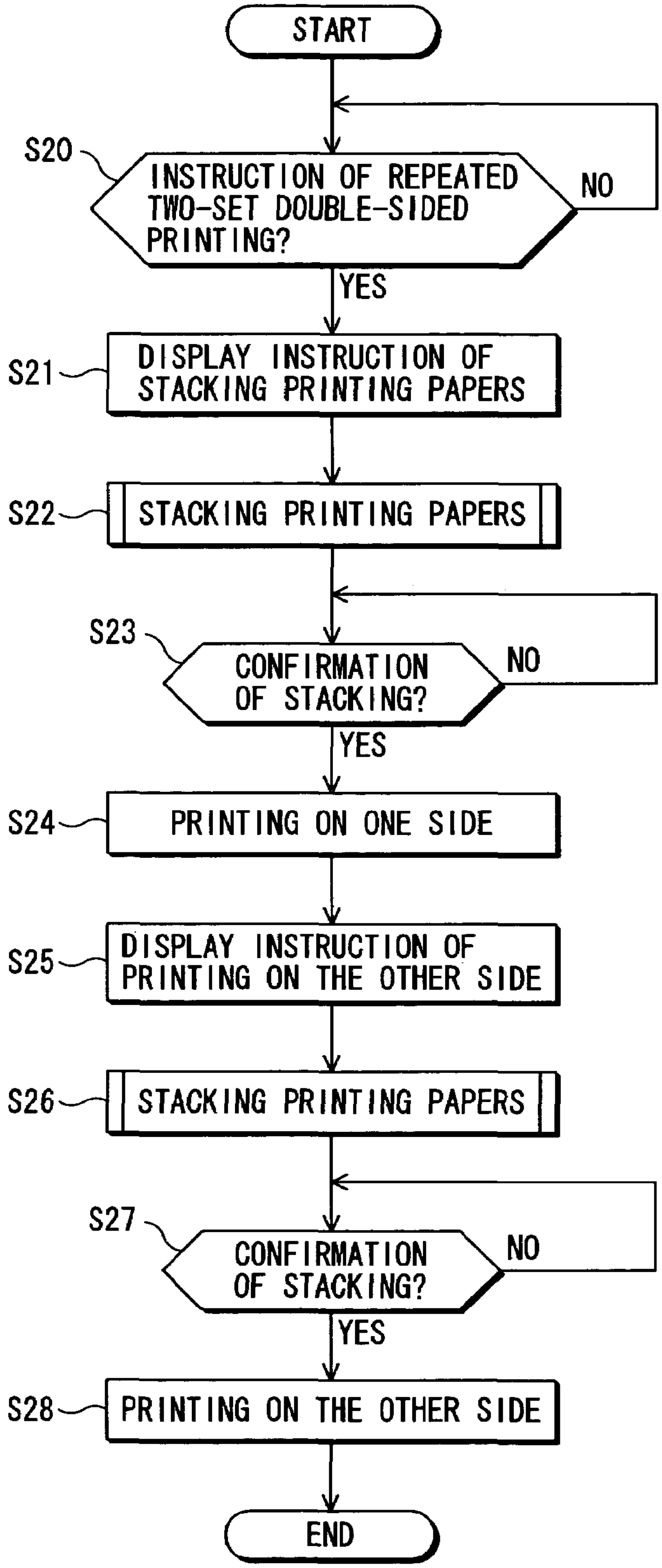
FIG. 7 is a flow chart for elucidating the procedure of the repeated two-set double-sided printing.

FIG. 7 is a flow chart for describing the procedure of the repeated two-set double-sided printing.

Firstly, the printing control section 15 identifies whether or not a user provides an instruction of the repeated two-set double-sided printing via the operation section 13 (step S20). In the case of no instruction, the system remains in the state of waiting for the instruction. If the instruction is received, an instruction in that paper sheets for the repeated two-set double-sided printing should be placed in the paper feed tray 33 for printing is indicated on the display unit 16 (step S21). In accordance with the indication, the user stacks the paper sheets for the repeated two-set double-sided printing on the paper feed tray 33 for printing (step S22), in which case, the number of paper sheets to be stacked is either the same or more than that in the initial reading stage when the total number in the latter case is even number, or that in the initial reading stage plus 1 or more when the total number in the latter case is odd.

Subsequently, the printing control section 15 identifies whether or not the paper sheets are placed on the paper feed tray 33 for printing (step S23). If not placed, the system remains in the state of waiting for the next action. However, if so, image data obtained in the whole paper reading process 159 are printed on one side of the paper sheets in the order of initial reading (step S24). In the next step S25, an indication that the paper sheets shall be placed in such a manner that the image data can be printed on the other side is displayed on the display unit 16. Accordingly, the user places the paper sheets on the paper feed tray 33 for printing in such a manner that the image data are sequentially printed on the other side thereof in the same order as that in step S22 (step S26).

Thereafter, the printing control section 15 examines whether or not the paper sheet are placed on the tray (step S27). If not so, the system remains in the state of waiting for the next event. However, if so, the printing on the other side is carried out. In this case, the printing control section 15 remembers the total number of the printing papers initially read, that is, it remembers the even/odd flag set in the initial stage. In accordance with the even/odd flag, the printing control section 15 executes either the even number sheet printing process 156 (the printing on the other side as shown in FIGS. 4A and 4B) or the odd number sheet printing process 157 (the printing on the other side as shown in FIGS. 5A and 5B), so that the printing on the other side can be completed (step S28).

The above-described procedure allows the two-set double-sided printing to be many times repeated, using the image data stored at the initial reading stage, so that a number of double-sided printing matters can be produced in very simple treatments.

While the present invention has been described with reference to the preferred embodiments, it is to be understood that the invention is not limited thereto. On the contrary, the invention is intended to cover various modifications and equivalent arrangements included within the spirit and scope of the appended claims.

What is claimed is:

1. A printer comprising:

image read means for reading out image data in each of printing papers;

data storage means for storing said image data thus read out;

image print means for printing said image data thus stored;

operation setting means for setting operation conditions of printing;

display means for displaying the operation state of said printer and the specified operation conditions; and print process means for executing processes required to print said image data in accordance with a predetermined program, wherein at least two pairs of printing papers, each paper having a printed content on one side and a blank page on the other side, are used, wherein, based upon an instruction of the two-set double-sided printing which is specified by said operation setting means, said print process means allocates each of said image data read out by said image read means to the corresponding sheet number, 1, 2, . . . , n−3, n−2, n−1, n of each printing paper, and determines the total number n of said printing papers by counting the sheet number, wherein in the case when the total number n of printing papers is even, an even-number-sheet printing control process is carried out, where image data for 2, 1, . . . , n−2, n−3, n, n−1-th printing paper are sequentially fed to said image print means, and printing papers, each of which is placed on a paper feed tray for printing in such a manner that its blank page on the other side is printable, are received in the order of reading by said image print means, whereby image data fed from said print process means are sequentially printed on the other side of the corresponding printing papers, so that a two-set double-sided printing is carried out; and wherein in the case when the total number n of printing papers is odd, an odd-number-sheet printing control process is carried out, where image data for 2, 1, . . . , n−3, n−4, n−1, n−2-th printing paper are sequentially fed to said image print means and finally said image data for n-th printing paper is fed to said image print means, and printing papers, each of which is placed on the paper feed tray for printing in such a manner that its blank page on the other side is printable, are received in the order of reading by said image print means and finally a supplementary paper sheet having blank pages on both sides is received, whereby image data for 2, 1, . . . , n−3, n−4, n−1, n−2-th printing paper fed from said print process means are sequentially printed on the other side of the corresponding printing papers and the image data for the n-th printing paper is forbidden to print on one side of the n-th printing paper, but printed on one side of the supplementary paper sheet, so that the two-set double-sided printing is carried out.

2. A printer according to claim 1, wherein said supplementary paper sheet has the same paper quality and the same size as the printing papers read out.

3. A printer according to claim 2, wherein the following copy process is further executed, when said print process means receives an instruction of a repeated two-set double-sided printing process input by said operation setting process means:

wherein in the case when the total number n of the printing papers initially read out is even, said image print means receives n paper sheets each having blank pages on both sides, and image data, which are initially read out from one side of each of said printing papers, and then stored in said data storage means, are sequentially printed on one side of said paper sheets, and thereafter said image print means again receives said paper sheets having image data printed on one side in the state that the other side thereof is printable, and the corresponding image data are sequentially printed on the other side of said n paper sheets in accordance with the instruction of said even-number-sheet printing control process supplied from said print process means, so that a copying of the two-set double-sided printing is once more carried out; and wherein in the case when the total number n of the printing papers initially read out is odd, said image print means receives n+1 paper sheets each having blank pages on both sides, and image data which are initially read out from one side of each of said printing papers and then stored in said storage means, are sequentially printed on one side of said paper sheets, and thereafter said image print means again receives said paper sheets having image data printed on one side in the state that the other side thereof is printable, and the corresponding image data are sequentially printed on the other side of said n+1 paper sheets in accordance with the instruction of said odd-number-sheet printing control process supplied from said print process means, so that a copying of the two-set double-sided printing is once more carried out.

4. A printer according to claim 3, wherein said paper sheets have the same paper quality and the same size as the printing papers initially read out.

5. A printer according to claim 1, wherein said print process means includes a central processing unit, a random access memory, a read only memory for storing a printing program to be executed, a first interface for receiving image data supplied from said image read means, a second interface for sending image data to said image print means and for receiving a count signal of printing papers therefrom, a third interface for receiving an operation setting signal from said operation setting means and a fourth interface for supplying signals representing the operation state of said printer and specified operation conditions to said display means, which are all interconnected to each other via a system bus.

6. A printer according to claim 1, wherein said image read means is an photo-electric scanner for photo-electrically reading out an image in a printing paper and for converting said image thus read out into an electric signal and outputs a signal corresponding to the number of printing papers read out.

7. A printer according to claim 1, wherein said image print means is a laser printer unit, which outputs a signal corresponding to the number of a printing paper to be printed and transmits the signal to said print process means, so that the signals corresponding to the image data supplied from said print process means are printed as an image.

8. A printer according to claim 1, wherein said image print means is an electrostatic printer unit which outputs a signal corresponding to the number of a printing paper to be printed and transmits the signal to said print process means, so that the signals corresponding to the image data supplied from said print process means are printed as an image.

9. A printer according to claim 1, wherein said image print means is an ink jet printer unit which outputs a signal corresponding to the number of a printing paper to be printed and transmits the signal to said print process means, so that the signals corresponding to the image data supplied from said print process means are printed as an image.

* * * * *